Patented Jan. 11, 1944

2,339,184

UNITED STATES PATENT OFFICE 2,339,184

STABILIZATION OF AQUEOUS DISPERSIONS OF POLYMERS OF VINYL ESTERS

Harry T. Neher, Bristol, and William R. Conn, Philadelphia, Pa., assignors to Röhm & Haas Company, Philadelphia, Pa.

No Drawing. Application July 5, 1941, Serial No. 401,266

4 Claims. (Cl. 260—32)

This invention relates to the stabilization of aqueous dispersions of polymers of a vinyl ester and of co-polymers of a vinyl ester and another polymerizable unsaturated material compatible therewith and capable of copolymerizing therewith.

Methods have already been developed for the preparation of aqueous dispersions of vinyl esters and mixed polymers prepared with vinyl esters. Such dispersions are generally satisfactory for a short time after their manufacture, but they deteriorate rapidly on storage. In some cases the particles coalesce with the formation of two layers; in other cases gels are formed and the emulsions "set up." Either type of instability destroys the utility of the dispersion. These phenomena are particularly troublesome in that the storage "life" of different batches made in apparently identical manner varies and the life of a dispersion cannot be foretold.

It has now been found that stability of an aqueous dispersion of a polymerized vinyl ester or of a co-polymer containing a vinyl ester is greatly improved if the acidity developed during polymerization is removed by addition of a dilute solution of an alkaline compound having a monovalent cation such as sodium hydroxide or a mixture of sodium hydroxide and an alkaline buffering salt, such as sodium acetate. The optimum degree of stabilization results by first adding a dilute alkaline solution until the dispersion is slightly alkaline and heating the alkaline dispersion to induce hydrolysis of a small part of the polymeric vinyl ester. Generally, hydrolysis of 2% to 5% of the vinyl polymer is sufficient to ensure excellent stability over a long period of time.

A process is described in U. S. Patent No. 2,127,135, issued August 16, 1938, by means of which an exact and easy control of polymerization of vinyl esters is made possible. A vinyl ester or mixture of monomeric ester and another polymerizable substance is emulsified in an aqueous solution containing an emulsifying agent. A polymerization catalyst is added and polymerization effected. During this procedure there inevitably occurs some hydrolysis of ester, yielding the corresponding acid. If now sufficient alkali is added to neutralize the dispersion or to bring it to a pH above 7, the dispersion is rendered stable over a considerable period of time. If after addition of an excess of alkali the polymerized dispersion is heated, even up to 100° C. or higher under pressure, partial saponification or hydrolysis occurs and the dispersion then possesses a remarkable degree of stability. It remains neutral or slightly alkaline for a long period of time.

In adjusting alkalinity and in hydrolyzing a portion of the dispersed polymer there may be used any soluble alkaline material such as sodium hydroxide, potassium hydroxide, ammonium hydroxide, quaternary ammonium hydroxide such as benzyl trimethyl ammonium hydroxide, sodium carbonate, or other strongly alkaline compound having a monovalent cation or such alkalies in conjunction with a buffer salt such as ammonium acetate, sodium acetate, or the like. It is generally undesirable to use an alkaline material which causes precipitation with a product of hydrolysis. The alkaline material should be added to the aqueous dispersion in the form of a dilute solution. The effect of concentrated solutions is frequently to cause an immediate coagulation. It is preferred to add the alkaline agent in such amount and concentration that the range of pH of the dispersion is between 7 and 12. A high pH is overcome by hydrolysis of the polymer and it is not necessary to hydrolyze an excessive amount of polymer to obtain a stability.

Further details of stabilizing action are shown in the following illustrative examples:

*Example 1*

In a five-liter flask equipped with agitator and reflux condenser there was placed a solution of 25 grams of the sodium salt of diisobutyl phenoxyethoxyethoxy ethyl sulfonate in 360 ml. of distilled water. There were then separately prepared the following:

(a) An emulsion of 1050 g. of vinyl acetate in a solution of 101 g. of diisobutyl phenoxyethoxyethoxyethyl sodium sulfonate in 1440 ml. of distilled water; and (b) A solution of 5.3 g. of ammonium persulfate in 150 ml. of distilled water.

To the solution in the five-liter flask there was then added 212 g. of the vinyl acetate emulsion and 13 g. of the ammonium persulfate solution. The mixture was stirred and heated in the flask until a temperature of 74° C. was reached at which temperature a violent reaction took place. When this reaction had subsided, the rest of the vinyl acetate emulsion and of the persulfate solution was added to the reaction flask during a period of about one hour. The temperature rose to about 90° C. as a result of the heat generated by the polymerization reaction. After the addition was completed, heat was supplied by a boiling water bath to raise the temperature to 96° C. The pressure in the flask was then reduced and 40 ml. of liquid removed by distillation. The dispersion was cooled to 55° C. and filtered. A sample of this dispersion was set aside and observed for stability. It had a pH of 2.5; titration of the acid indicated that 1.5% of the vinyl ester had been hydrolyzed during polymerization. Hydrolysis of the polyvinyl ester continued, setting free acid progressively, until after 305 days 82% of the polymer had hydrolyzed and the dispersion had changed to a clear, viscous solution.

A second sample was made slightly alkaline with a dilute sodium hydroxide solution. It began to show evidence of hydrolysis in about three weeks, but hydrolysis proceeded at a very low rate. There was no separation or gelation after 305 days and the titratable acidity indicated that not more than 1.2% of the polyvinyl ester had been hydrolyzed during that time.

A third sample was treated with one-third of its weight of 0.53 N of sodium hydroxide solution and heated for one hour at 65° C. and then at 75° C. for five minutes. This sample remained stable during a test period of over 305 days and had a pH of 6.5 at the end of this period.

A fourth sample was neutralized with sodium hydroxide as in the case of the second sample and 2.5% of polyvinyl alcohol added to the neutral solution. This sample had a stability identical with that of the second sample, indicating that added polyvinyl alcohol had no value in stabilizing the emulsion.

Example 2

An emulsion was prepared from 675 g. of vinyl acetate and 450 g. of ethyl methacrylate in a solution of 108 g. of isooctyl phenoxyethoxyethyl sodium sulfonate in 1483 ml. of distilled water. There was also prepared a solution of 11.3 g. of ammonium persulfate in 100 ml. of water. There was then prepared in a five-liter flask equipped with agitator and reflux condenser a solution of 27 g. of iso-octyl phenoxyethoxyethyl sodium sulfonate in 370 ml. of water. To the latter solution there was added 400 g. of the above emulsion and 15 ml. of the ammonium persulfate solution. The mixture was stirred and heated until the initial reaction was complete. The rest of the emulsion and the persulfate solution were added over a period of three hours while the resulting mixture was stirred and maintained at 75°–84° C. The temperature was then raised to 95° C. by means of a boiling water bath. The pressure in the flask was reduced and 35 ml. of liquid distilled therefrom. The emulsion was cooled to 75° C., half of the dispersion removed, and the balance treated with a solution of 13 g. of sodium hydroxide in 490 ml. of water. The temperature of the diluted alkaline dispersion was maintained at 60° C. for an hour. This partially hydrolyzed sample was stored for a period of ten months without separation or gelation occurring and without hydrolysis.

A sample of the original dispersion was 39% hydrolyzed within 10 months.

Another sample of the original dispersion was neutralized with a 0.47 N sodium hydroxide solution. It began to hydrolyze within three months, but hydrolysis proceeded only very slowly.

Example 3

An emulsion was prepared from 788 g. of vinyl acetate, 263 g. of ethyl acrylate, 101 g. of diisobutyl phenoxyethoxyethyl sodium sulfonate, and 1440 ml. of water. 212 g. of this emulsion was added to a solution of 25 g. of diisobutyl phenoxyethoxyethoxyethyl sodium sulfonate in 360 ml. of water in a five-liter flask equipped with a stirrer and reflux condenser. There was then added 13 ml. of a solution prepared from 5.3 g. of ammonium persulfate and 150 ml. of water. The contents of the flask was stirred and heated until a temperature of 83° C. was reached. The rest of the emulsion of monomer and of the persulfate solution were then gradually added to the flask during a period of one and one-half hours and the temperature of the mixture kept at 72–85° C. The temperature was then raised to 96° C., the pressure in the flask reduced and 40 ml. of liquid distilled therefrom. The resulting dispersion was cooled to 50° C. and filtered.

A sample of the dispersion as thus prepared was set aside and observed from time to time. It hydrolyzed slowly but progressively so that after 305 days 39% of the polymer had hydrolyzed, calculated from the acid liberated.

A sample of 704 g. was stirred with 295 ml. of 0.47 N sodium hydroxide solution at 60° C. for an hour. This preparation was entirely stable over a ten-month test period and it still had pH of 7.12 at the end of this time.

Example 4

An emulsion was prepared from 1068 parts of distilled water, 67.5 parts of octylphenoxyethoxyethoxyethyl sodium sulfonate, 3.5 parts of ammonium persulfate, and 700 parts of vinyl acetate. A portion of 141 parts of this emulsion was added to a solution of 16.5 parts of octylphenoxyethoxyethoxyethyl sodium sulfonate in 244 parts of distilled water, which was contained in a vessel equipped with agitator and reflux condenser. The vessel was then heated until the temperature reached 80° C., at which time polymerization was complete. The rest of the original emulsion was then gradually added while the temperature was maintained between 80° and 90° C. The temperature was then raised to 96° C. and a stream of air passed through the polymerized dispersion to remove traces of unpolymerized vinyl acetate.

Portions of the finished dispersion were then taken and neutralized with 0.5 N sodium hydroxide solution, 0.5 N potassium hydroxide, ammonia, 0.5 N sodium carbonate solution and 0.5 N triethanolamine solution. These portions were stored and remained stable over a long period of time. On the other hand, the addition of barium hydroxide or calcium hydroxide caused coagulation of the polymer.

In place of the vinyl acetate shown in the above examples there may be used other vinyl esters, such as vinyl propionate, butyrate, chloropropionate, etc., alone, or in combination, or in conjunction with other polymerizable unsaturated substances which are compatible and which are capable of forming co-polymers such as the acrylate or methacrylate esters, as for example the methyl, ethyl, propyl, butyl, octyl, dodecyl, cetyl, benzyl, cyclohexyl, etc. esters, acrylonitrile, methacrylonitrile, acrylic or methacrylic acid, etc.

We claim:

1. The process of stabilizing an aqueous dispersion of solid polyvinyl acetate prepared by the polymerization of an aqueous emulsion of monomeric vinyl acetate followed by the removal of unpolymerized vinyl acetate, which comprises adjusting the pH of the dispersion to a value of from 7 to 12 by the addition of an alkaline compound having a monovalent cation, and inducing a partial hydrolysis equal to from 2 to 5% of the polyvinyl acetate by heating the alkaline dispersion.

2. The process of stabilizing an aqueous dispersion of a solid vinyl ester polymer prepared by the polymerization of an aqueous emulsion of vinyl acetate and an acrylic acid ester of a saturated alcohol followed by the removal of unpolymerized monomeric material, which comprises adjusting the pH of the dispersion to a value of from 7 to 12 by the addition of an alkaline compound having a monovalent cation, and inducing a partial hydrolysis equal to from 2 to 5% of the vinyl ester polymer by heating the alkaline dispersion.

3. The process of stabilizing an aqueous dispersion of a solid vinyl ester polymer prepared by the polymerization of an aqueous emulsion of vinyl acetate and a methacrylic acid ester of a saturated alcohol followed by the removal of unpolymerized monomeric material, which comprises adjusting the pH of the dispersion to a value of from 7 to 12 by the addition of an alkaline compound having a monovalent cation, and inducing a partial hydrolysis equal to from 2 to 5% of the vinyl ester polymer by heating the alkaline dispersion.

4. The process of stabilizing an aqueous dispersion of a solid vinyl ester polymer selected from the group consisting of polymers of vinyl esters of lower saturated fatty acids and copolymers thereof with the nitrile and saturated alcohol esters of acrylic and methacrylic acid, which dispersion is prepared by the polymerization of an aqueous emulsion of the monomeric materials followed by the removal of unpolymerized monomeric material, which comprises adjusting the pH of the dispersion to a value of from 7 to 12 by the addition of an alkaline compound having a monovalent cation, and inducing a partial hydrolysis equal to from 2 to 5% of the vinyl ester polymer by heating the alkaline dispersion.

HARRY T. NEHER.
WILLIAM R. CONN.